(12) United States Patent
Wotzak

(10) Patent No.: US 9,611,787 B2
(45) Date of Patent: Apr. 4, 2017

(54) ACCESSORY APPARATUS AND METHOD OF ASSEMBLING ACCESSORIES WITH A TURBINE ENGINE

(71) Applicant: General Electric Company, Schenectady, NY (US)

(72) Inventor: Mark Gregory Wotzak, Chestnut Hill, MA (US)

(73) Assignee: General Electric Company, Schenectady, NY (US)

(*) Notice: Subject to any disclaimer, the term of this patent is extended or adjusted under 35 U.S.C. 154(b) by 81 days.

(21) Appl. No.: 14/714,501

(22) Filed: May 18, 2015

(65) Prior Publication Data

US 2016/0341129 A1 Nov. 24, 2016

(51) Int. Cl.
*F02C 7/32* (2006.01)
*F01D 25/28* (2006.01)
*F02C 7/275* (2006.01)
*F02C 7/36* (2006.01)
*B23P 19/04* (2006.01)

(52) U.S. Cl.
CPC ............ *F02C 7/32* (2013.01); *B23P 19/04* (2013.01); *F01D 25/28* (2013.01); *F02C 7/275* (2013.01); *F02C 7/36* (2013.01); *F05D 2240/40* (2013.01); *F05D 2260/40311* (2013.01)

(58) Field of Classification Search
CPC .... F02C 7/32; F02C 7/36; F02C 7/275; B23P 19/04; F01D 25/28; F05D 2240/40; F05D 2260/40311
USPC .......................................................... 60/802
See application file for complete search history.

(56) References Cited

U.S. PATENT DOCUMENTS

| 3,835,642 A | * | 9/1974 | Amann | ................... B64D 13/06 417/319 |
| 4,525,995 A | * | 7/1985 | Clark | ...................... F01D 25/18 184/6.11 |
| 6,170,252 B1 | | 1/2001 | Van Duyn | |
| 7,500,365 B2 | | 3/2009 | Suciu et al. | |
| 8,230,636 B1 | | 7/2012 | Swan | |
| 8,490,410 B2 | | 7/2013 | Suciu et al. | |

(Continued)

FOREIGN PATENT DOCUMENTS

| EP | 2239440 A1 | 10/2010 |
| EP | 2530282 A1 | 12/2012 |

(Continued)

OTHER PUBLICATIONS

European Search Report and Opinion issued in connection with corresponding EP Application No. 16160219.8 on Oct. 24, 2016.

*Primary Examiner* — Corey Skurdal
(74) *Attorney, Agent, or Firm* — General Electric Company; Pamela A. Kachur

(57) ABSTRACT

A method of assembling accessories with a turbine engine and an accessory apparatus for a gas turbine engine having a first shaft that rotates when the gas turbine engine is energized. The accessory apparatus includes a mount rail attached to the gas turbine engine and extending parallel to the first shaft of the gas turbine engine a first accessory having a first mounting block, to mount the first accessory to the mount rail, and an first accessory shaft to power the first accessory and a second accessory having a second mounting block, to mount the second accessory to the mount rail, and a second accessory shaft to power the second accessory.

17 Claims, 6 Drawing Sheets

(56) References Cited

U.S. PATENT DOCUMENTS

| | | | |
|---|---|---|---|
| 8,763,264 B2* | 7/2014 | Catteau | B23P 11/00 29/464 |
| 2006/0248900 A1* | 11/2006 | Suciu | F02C 7/32 60/802 |
| 2006/0277920 A1 | 12/2006 | Bart et al. | |
| 2009/0205341 A1 | 8/2009 | Muldoon | |
| 2010/0242496 A1 | 9/2010 | Cass et al. | |
| 2011/0148234 A1 | 6/2011 | Lemmers, Jr. et al. | |
| 2012/0006137 A1 | 1/2012 | Short et al. | |
| 2012/0159964 A1 | 6/2012 | Huang et al. | |
| 2012/0167591 A1 | 7/2012 | Drachsler et al. | |
| 2013/0098058 A1 | 4/2013 | Sheridan | |
| 2013/0160459 A1* | 6/2013 | Thies | F02C 7/32 60/796 |
| 2013/0202417 A1 | 8/2013 | Spanos et al. | |
| 2013/0269479 A1* | 10/2013 | van der Merwe | F16H 57/025 74/606 R |

FOREIGN PATENT DOCUMENTS

| | | |
|---|---|---|
| JP | 2005106032 A | 4/2005 |
| WO | 2013098498 A1 | 7/2013 |

* cited by examiner

ACCESSORY APPARATUS AND METHOD OF ASSEMBLING ACCESSORIES WITH A TURBINE ENGINE

STATEMENT REGARDING FEDERALLY SPONSORED RESEARCH OR DEVELOPMENT

This invention was made with government support under Contract No. W911W6-13-2-0009 awarded by the United States Army Aviation Applied Technology Directorate. The United States has certain rights in this invention.

BACKGROUND OF THE INVENTION

Gas turbine engines, also known as combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for airplanes and helicopters, where they primarily are used for propulsion.

Gas turbine engines usually also power a number of different accessories such as generators, starter/generators, permanent magnet alternators (PMA) and/or permanent magnet generators (PMG), fuel pumps, and hydraulic pumps. All these accessories provide for functions needed on the aircraft other than propelling the aircraft. For example, when a gas turbine engine is running, the starter generator (S/G) produces electrical power, some of which may be stored; when the gas turbine engine needs to be started, the S/G functions as a starting motor when provided energy from another energy source, such as the previously stored electrical power.

Typically, an accessory gearbox is included with a gas turbine engine, and has a main gearbox housing for receiving a plurality of gears to drive the different accessories. Accessory gearboxes are expensive, heavy, take up a lot of space, have many unique parts, generate heat, leak oil, require scavenges, churn oil, require many special processes, and require endurance and fire testing for certification. An accessory gearbox is typically one of the heaviest components on an engine, ranging from 30 to 300 pounds. Further, the accessory gearbox is also one of the most expensive components with very large tooling costs. Further, the accessory gearbox can include hundreds of unique parts. The number of parts can drive manufacturer supply chain issues.

BRIEF DESCRIPTION OF THE INVENTION

One embodiment of the invention relates to an accessory apparatus for a gas turbine engine having a first shaft that rotates when the gas turbine engine is energized, the apparatus having at least one mount rail attached to the gas turbine engine and extending parallel to the first shaft of the gas turbine engine, a first accessory having a first mounting block, to mount the first accessory to the mount rail, and a first accessory shaft to power the first accessory, and a second accessory having a second mounting block, to mount the second accessory to the mount rail, and a second accessory shaft to power the second accessory wherein the first accessory shaft and the second accessory shaft are operably coupled to the first shaft of the gas turbine engine and with each other wherein the first accessory or the second accessory is mounted to the at least one mount rail via its mounting block and its corresponding accessory shaft is connected to the first shaft of the gas turbine engine and wherein the first accessory shaft and the second accessory shaft are connected to each other.

Another embodiment of the invention relates to an accessory apparatus for a turbine engine having a first shaft that rotates when the turbine engine is energized, and having a gearbox to transfer rotational motion of the first shaft of the turbine engine to a second shaft, the apparatus having at least one mount rail attached to the turbine engine and extending parallel to the second shaft, and at least two accessories, each having a mounting block to mount the respective accessory to the mount rail, and each having an individual accessory shaft to power the accessory, wherein the individual accessory shafts are disposed to be coaxial with the second shaft and with each other, wherein one of the at least two accessories is mounted to the at least one mount rail via its mounting block with its individual accessory shaft connected to the second shaft and wherein the individual accessory shafts are connected to each other Yet another embodiment of the invention relates to a method of assembling accessories with a turbine engine including mounting a first accessory component to a mount rail secured to a gas turbine engine having a first shaft that rotates when the turbine engine is energized, and extending away from the turbine engine parallel to the first shaft of the gas turbine engine, connecting an accessory shaft in the first accessory component to the first shaft of the gas turbine engine, mounting a second accessory component to the mount rail and in engagement with the first accessory component, and connecting an accessory shaft in the second accessory component to the accessory shaft in the first accessory component.

DETAILED DESCRIPTION OF THE INVENTION

Figure 1:
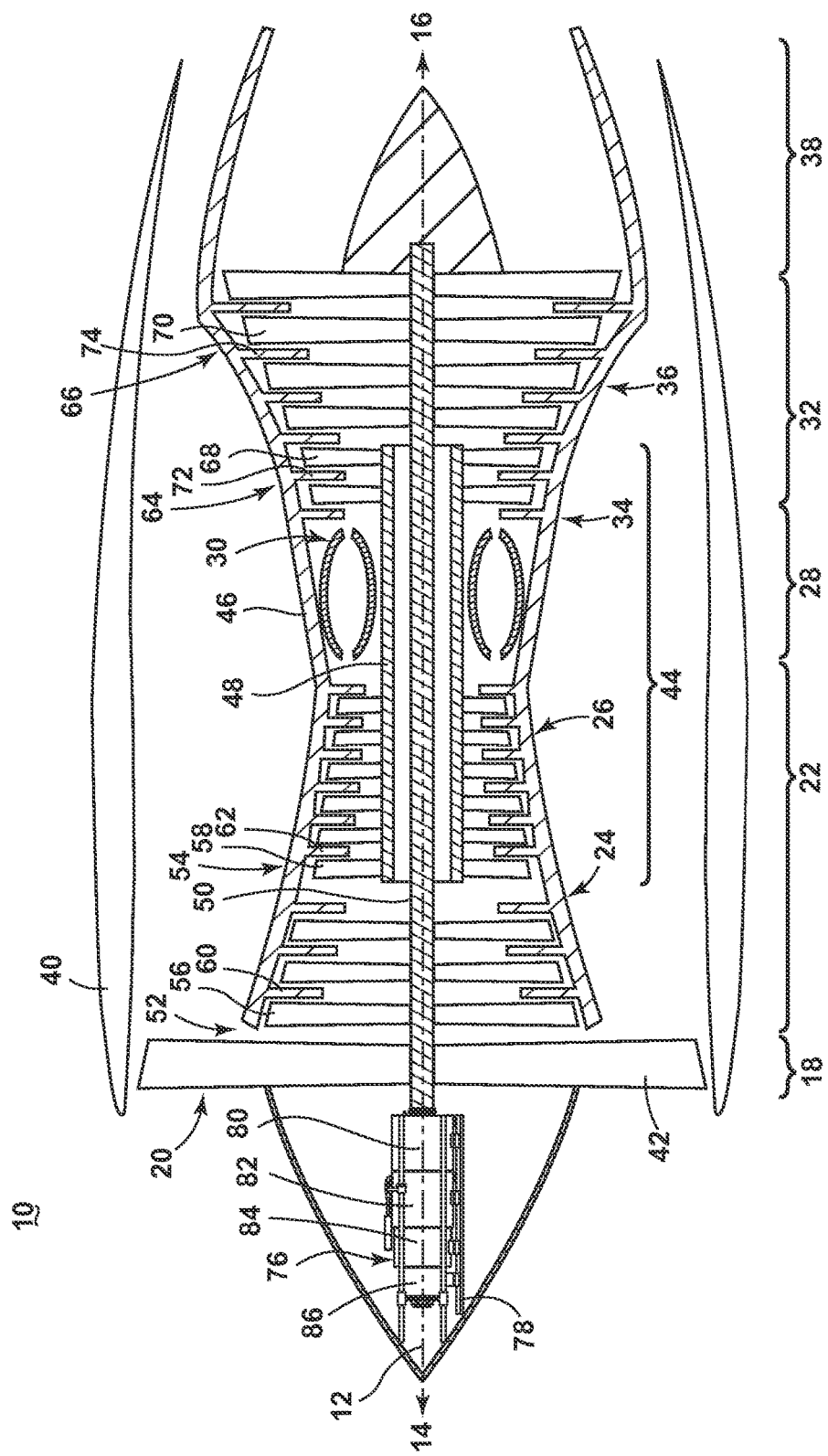
FIG. 1 is a cross-sectional schematic illustration of a gas turbine engine with an accessory apparatus according to an embodiment of the invention.

FIG. 1 illustrates a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by a core casing 46 which can be coupled with the fan casing 40. A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or be used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Another source of cooling fluid can be, but is not limited to, fluid discharged from the LP compressor 24 or the HP compressor 26.

An accessory apparatus 76 is schematically illustrated mounted to the gas turbine engine 10. The accessory apparatus 76 can include a set of mount rails 78 attached to the gas turbine engine 10. It will be understood that "a set" as used herein can include any number, including only one. The accessory apparatus 76 can be located in any suitable portion of the gas turbine engine including, but not limited to, attached to a fan frame, along the engine centerline at either the forward or aft end, off a gearbox, attached to a motor, etc. In the illustrated example, the mount rails 78 have been illustrated as extending parallel to the centerline 12, the HP spool 48, and the LP spool 50. Alternatively, no rails can be included and the accessory apparatus 76 can still have guides attached to the driver and be supported otherwise.

The accessory apparatus 76 can be coupled to any suitable shaft of the gas turbine engine 10 that rotates when the gas turbine engine 10 is energized. For example, the accessory apparatus 76 can be operably coupled to a turbine shaft of the gas turbine engine 10 including either the HP spool 48 or the LP spool 50. By way of non-limiting example, the accessory apparatus 76 has been illustrated as being operably coupled with the LP spool 50. The accessory apparatus 76 can be coupled either directly or indirectly, such as through any suitable gearing mechanism, to the shaft of the gas turbine engine 10. By way of non-limiting examples, the accessory apparatus 76 can be driven by a power turbine of the gas turbine engine 10, a core of the gas turbine engine 10, an intermediate spool, a shaft of an electric motor of the gas turbine engine 10, a hydraulic motor of the gas turbine engine 10, bleed air, an accessory, a belt from a neighboring accessory apparatus, etc.

Figure 2:
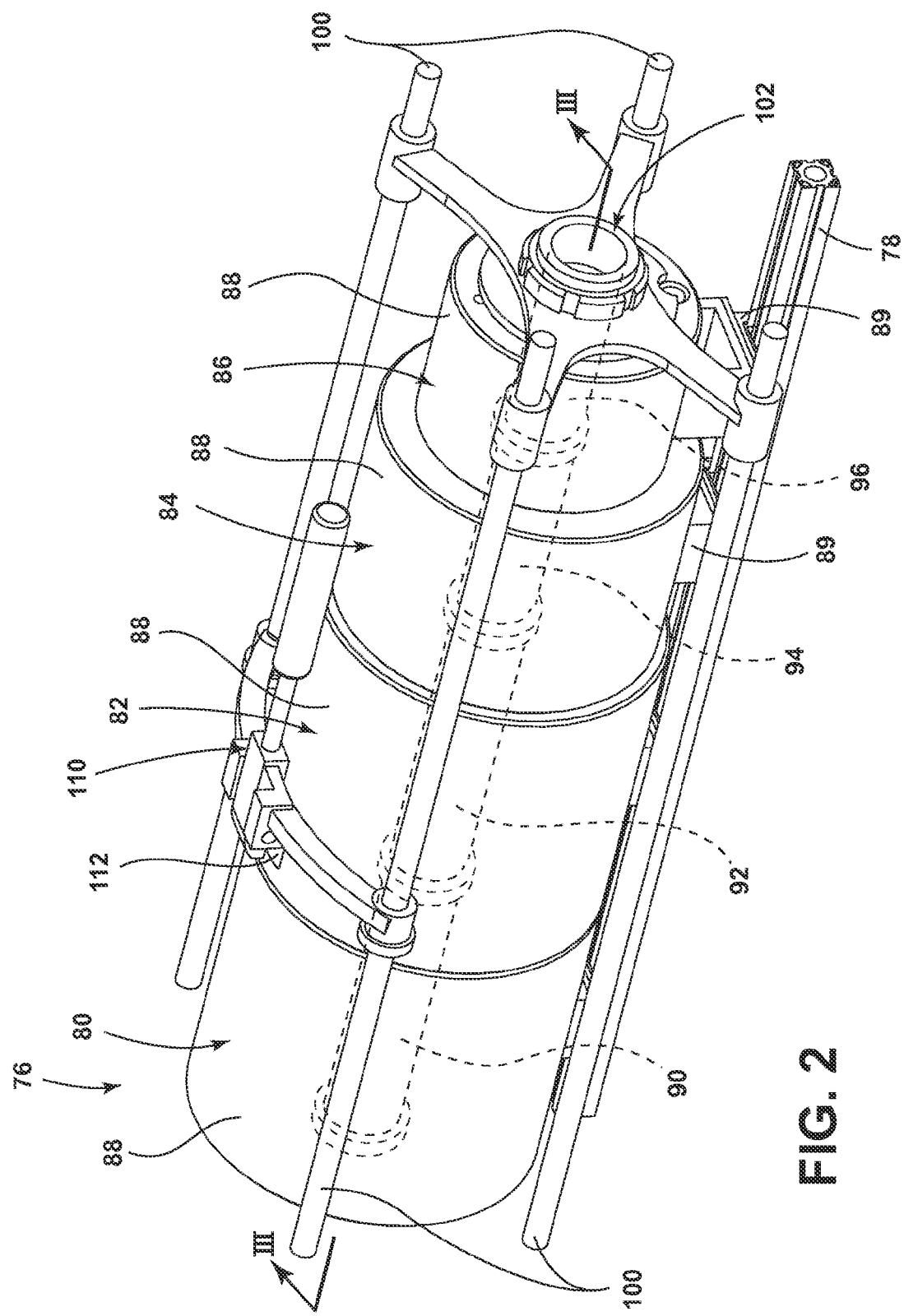
FIG. 2 is a perspective view of the accessory apparatus of FIG. 1.

Referring now to FIG. 2, the accessory apparatus 76 is shown in greater detail and it can more easily be seen that a first accessory 80, a second accessory 82, a third accessory 84, and a fourth accessory 86 are illustrated as being included in the accessory apparatus 76. It will be understood that any combination of accessories can be included in the accessory apparatus 76 so long as two accessories are included. Further still, any suitable type of accessories can be included in the accessory apparatus 76. By way of non-limiting examples, suitable types of accessories can include, but are not limited to, a starter, a fuel pump, a lubrication pump, a hydraulic pump, a permanent magnet alternator (PMA), a permanent magnet generator (PMG), a variable frequency generator (VFG), or a line replaceable unit.

The combination of accessories can be mounted on the mount rail(s) 78 such that they can be line replaceable units. The combination of accessories can be designed to connect to each other to form a linear stack of accessories that forms the accessory apparatus 76. As illustrated, the accessory components 80, 82, 84, 86 include mounting blocks 88 that can be utilized to mount the accessory components 80, 82, 84, 86 to the mount rail 78. More specifically, the mounting block(s) 88 can include an interface 89 that allows the accessory components 80, 82, 84, 86 to be mounted to the at least one mount rail 78 via the mounting block 88. This can include that the accessory components 80, 82, 84, 86 are slidably mounted to the mount rail 78 via the interface 89. Alternatively, mounting blocks can be excluded and the accessory components can be mounted via any suitable housing.

A first accessory shaft 90 is included within the first accessory 80. The first accessory shaft 90 can be connected to a shaft of the gas turbine engine 10 and in this manner the first accessory shaft 90 can power the first accessory 80 during operation. Similarly, a second accessory shaft 92 is included in the second accessory 82, a third accessory shaft 94 is included in the third accessory 84, and a fourth accessory shaft is included in the fourth accessory 86, the accessory shafts power each of the respective accessory components during operation. The accessory shafts 90, 92, 94, and 96 are operably coupled to each other. In the illustrated example, accessory shafts 90, 92, 94, and 96 are directly connected to each other. The accessory shafts 90, 92, 94, and 96 are also operably coupled to each other and with the LP spool 50 of the gas turbine engine 10. The accessory shafts 90, 92, 94, and 96 can be constructed by any known materials and methods, including, but not limited to extrusion or machining of high strength metal alloys including, but not limited to, those containing aluminum, iron, nickel, chromium, titanium, tungsten, etc. Further still, while the diameters of the accessory shafts 90, 92, 94, and 96 have been illustrated as being the same it will be understood that the diameters can be varied in any suitable manner.

A set of clamp rails 100 can also be attached to the gas turbine engine 10 and can be spaced from and extend parallel to the mount rail 78. A clamp nut 102 can be slidably mounted to the clamp rail(s) 100. The clamp nut 102 can be attached to one of the accessory components and can be utilized to retain all of the accessory components in place. In the illustrated example, the clamp nut 102 is fit against the fourth accessory component 88 and tightened. While not illustrated, the fourth accessory component 88 can include a threaded piece such that the clamp nut 102 can be threaded and tightened thereon. It will be understood that any suitable alternative fasteners can be utilized to hold the accessory components 80, 82, 84, 86 together. A benefit to the illustrated example includes that there is no need for fastening hardware between the accessory components 80, 82, 84, 86; however it will be understood that fasteners between the components could also be utilized and that the clamp need not be attached to the first accessory. By way of further non-limiting examples, a V-Band clamp can be utilized between accessories, a hook and latch clamp can be utilized between accessories, or traditional fasteners including, but not limited to, bolts, nuts, and studs can be utilized between accessories.

The accessory components 80, 82, 84, 86 can be line replaceable units and removal can be accomplished by disconnecting fluid and electrical lines, removing the clamp nut 102 and separating the accessory to be replaced from any accessories forward and aft of the accessory to be replaced. A jacking lever 110 is illustrated as an exemplary jacking device that can be utilized in separating the accessory components 80, 82, 84, 86. The jacking lever 110 can be mounted to one or more of the clamp rails 100. The jacking lever 110 can be configured to slide along the one or more of the clamp rails 100 to a desired position where it can be utilized in jacking the accessory component apart from the remainder of the accessory apparatus 76. The mounting block(s) 88 can include complementary jacking features or receiver(s) 112 to aid the jacking lever 110 in interacting with the accessory components 80, 82, 84, 86. The jacking lever 110 can be operable between a stored position and a use position (shown in phantom in FIG. 3) where it engages a mounting block 88 of one of the accessory components 80, 82, 84, 86.

Figure 3:
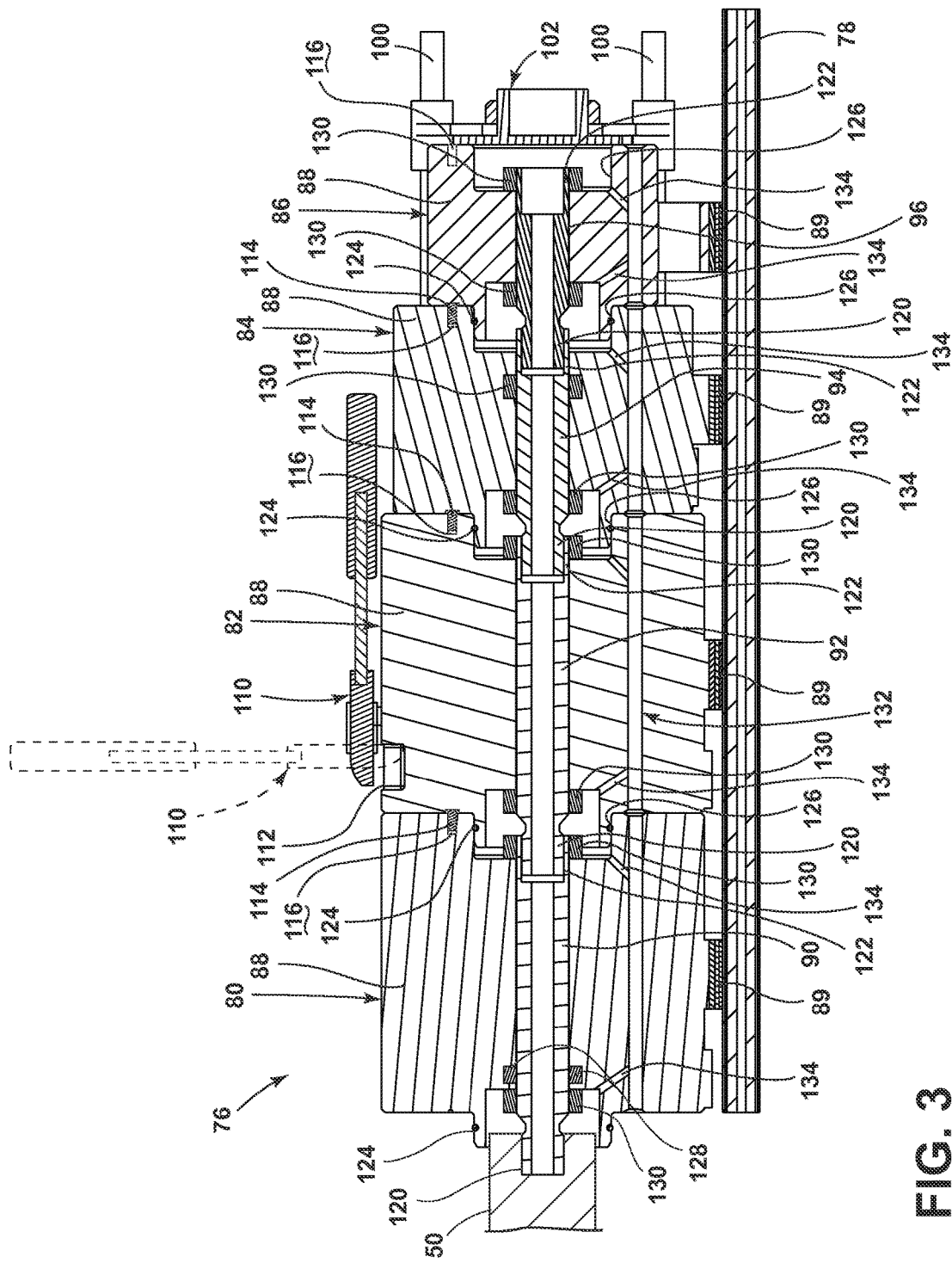
FIG. 3 is a cross-sectional view of the accessory apparatus of FIG. 2 taken along line III-III.

Referring now to FIG. 3, while the mounting blocks 88 have been illustrated as having mostly solid interiors this was done for clarity purposes and it will be understood that the mounting blocks 88 house not only the parts specified in this description but also include the specific internals for each of the accessory components 80, 82, 84, 86. The mounting blocks 88 can be formed by any known materials and methods, including, but not limited to, die-casting of high strength and lightweight metals such as aluminum, stainless steel, iron, or titanium. The mounting blocks 88 can form a housing for the internal components of the accessory components 80, 82, 84, 86 and thus can be formed with a thickness sufficient to provide adequate mechanical rigidity without adding unnecessary weight to the accessory apparatus 76 and, therefore, the aircraft. Locating pins 114 and complementary recesses 116 can be included in each of the accessory components 80, 82, 84, 86 to aid in properly positioning each of the accessory components 80, 82, 84, 86 with respect to each other.

As more clearly seen in FIG. 3, the shafts 90, 92, 94, 96 of the accessory components 80, 82, 84, 86 include a male spline 120 on one end and female spline 122 on an opposite end. O-rings 124 and O-ring pilots 126 can be included and can transfer torque and seal fluids from one accessory to another. Additional seals including, but not limited to, shaft seals 128 can also be included. Further, each of the accessory components 80, 82, 84, 86 can include its own bearings 130.

Any number of the accessory components 80, 82, 84, 86 can also contain lubricants including, but not limited to, oil to provide lubrication and cooling to mechanical parts contained therein. The accessory components 80, 82, 84, 86 can have transfer tubes or other seals to allow for fluid communication between each other. In the illustrated example, a scavenge circuit 132 extends through the accessory components 80, 82, 84, 86 and each accessory component 80, 82, 84, 86 includes a set of scavenge drains 134. While the scavenge circuit 132 is intended to be a circuit for scavenging oil it will be understood that this is only one type of fluid circuit that can be included in the accessory apparatus 76. Other fluid circuits can be included and by way of example can include, but are not limited to, fuel and oil supply circuits.

By way of further example there can be a common lube supply to accessory bearings, splines, seal runners, as well as fluid transfer between accessories including, but not limited to, jumper tubes, face seals, etc. The accessory apparatus 76 can also include a common health monitoring system that can include, but is not limited to, accelerometers, torque sensors, temp sensors, etc. Further still, the accessories can be electrically connected, electrical components can be isolated, a coating can be included on any of the accessories, isolators can be included between shafts of the accessories, or ground straps can be utilized.

During operation, the spool 50 of the gas turbine engine 10 rotates, which in turn rotates the first accessory shaft 90 that is coupled to the spool 50. This in turn rotates the coupled shafts 92, 94, and 96 of the accessory components 82, 84, and 86. In this manner, the accessory components 80, 82, 84, 86 of the accessory apparatus 76 are driven directly from a shaft of the gas turbine engine 10. The shafts 90, 92, 94, and 96 of the accessory components 80, 82, 84, 86 will be driven at a common speed with the spool 50. A speed can be chosen to ensure the proper operation of each of the accessory components 80, 82, 84, 86.

Figure 4:
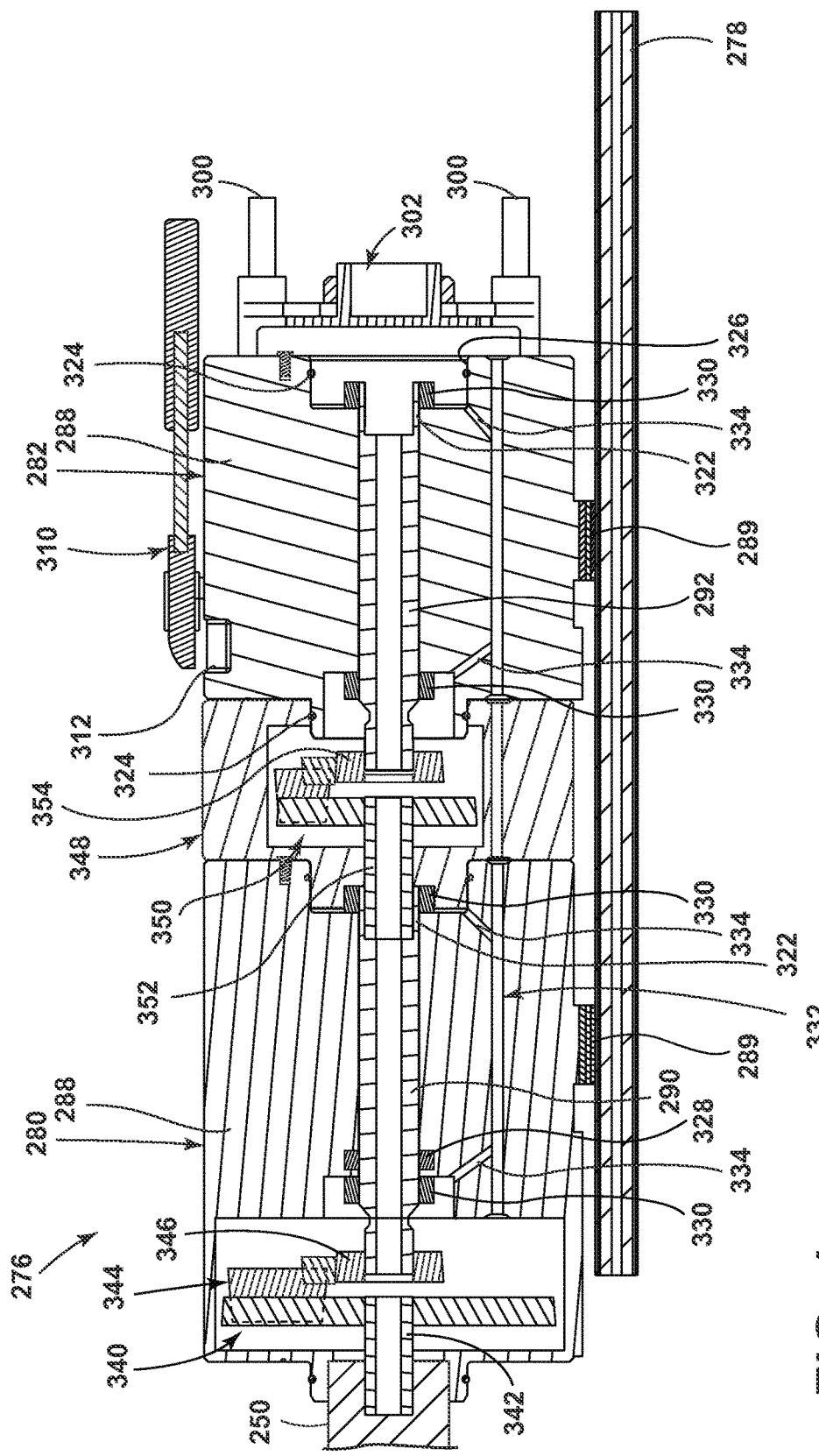
FIG. 4 is a cross-sectional view of an alternative accessory apparatus, which can be utilized in the gas turbine engine of FIG. 1, according to another embodiment of the invention.

FIG. 4 illustrates an accessory apparatus 276 according to a second embodiment of the invention. The second embodiment of the accessory apparatus 276 is similar to the first embodiment of the accessory apparatus 76. Therefore, like parts will be identified with like numerals increased by 200, with it being understood that the description of the like parts of the first embodiment applies to the second embodiment, unless otherwise noted.

The accessory apparatus 276 illustrated in FIG. 4 only includes first and second accessory components 280 and 282 with each including a mounting block 288 to mount the accessory components 280 and 282 to the mount rail 278, and each having an individual accessory shaft 290 and 292 to power the accessory components 280 and 282, respectively. The individual accessory shafts 290 and 292 are disposed to be coaxial with each other and with a rotatable shaft 250 connected to the gas turbine engine.

One difference is that a gear mechanism 340 has been included in the first accessory component 280 to drive the first accessory component 280 at a speed different than a rotational speed of the shaft 250. Any suitable gearing or gear train mechanism can be included in any of the accessory components 280 and 282 to either increase or decrease the speed of its internal shaft. In the illustrated example, the shaft 250 from the gas turbine engine operably couples with an input 342 to the gear mechanism 340, which in turn operates the gear train 344 and results in a change in speed of an output 346 of the gear mechanism 340, which is operably coupled with the first shaft 290.

Another difference is that the accessory shafts 290 and 292 have been illustrated as being connected to each other via a gear mechanism 348, which is located between the accessory components 280 and 282. The gear mechanism 348 can also include any suitable gearing or gear train mechanism 350, an input 352, and an output 354 configured to drive the second accessory component 282 at either an increased or decreased speed as compared to the first accessory shaft 290.

In this manner it will be understood that gearing within the accessories or between the accessories can be included for better accessory performance and that the use of such gear mechanisms can result in driving the accessory component at a speed different than a rotational speed of the shaft of the gas turbine engine and at a different rotational speed than the accessory component before it. Further, belts and pulleys can be utilized to change speed between the accessories or provide motion from a neighboring accessory apparatus.

It is further contemplated that multiple stacks of accessories can be created off of a small gearbox such as a transfer gearbox to handle wider speed variation. The ability to have multiple accessory apparatuses or single accessories in addition to a main accessory apparatus can also aid in better utilizing space within the aircraft. For example, the transfer gearbox can have individual component(s) mounted forward, aft, or off to the sides where the main accessory apparatus is not located.

Further, while the above described embodiments include that the accessory shafts are disposed coaxially with the first shaft of the gas turbine engine and with each other it is contemplated that the accessory shafts can be operably coupled to each other and the shaft of the gas turbine in any suitable manner. For example, it is contemplated that a single main shaft can run the length of the accessory apparatus and that the accessories can have their own concentric shafts that are splined to this main shaft. If an accessory fails, this allows for the other accessories to continue operating. The main shaft would have to be removed prior to removing an accessory from the accessory apparatus.

Figure 5:
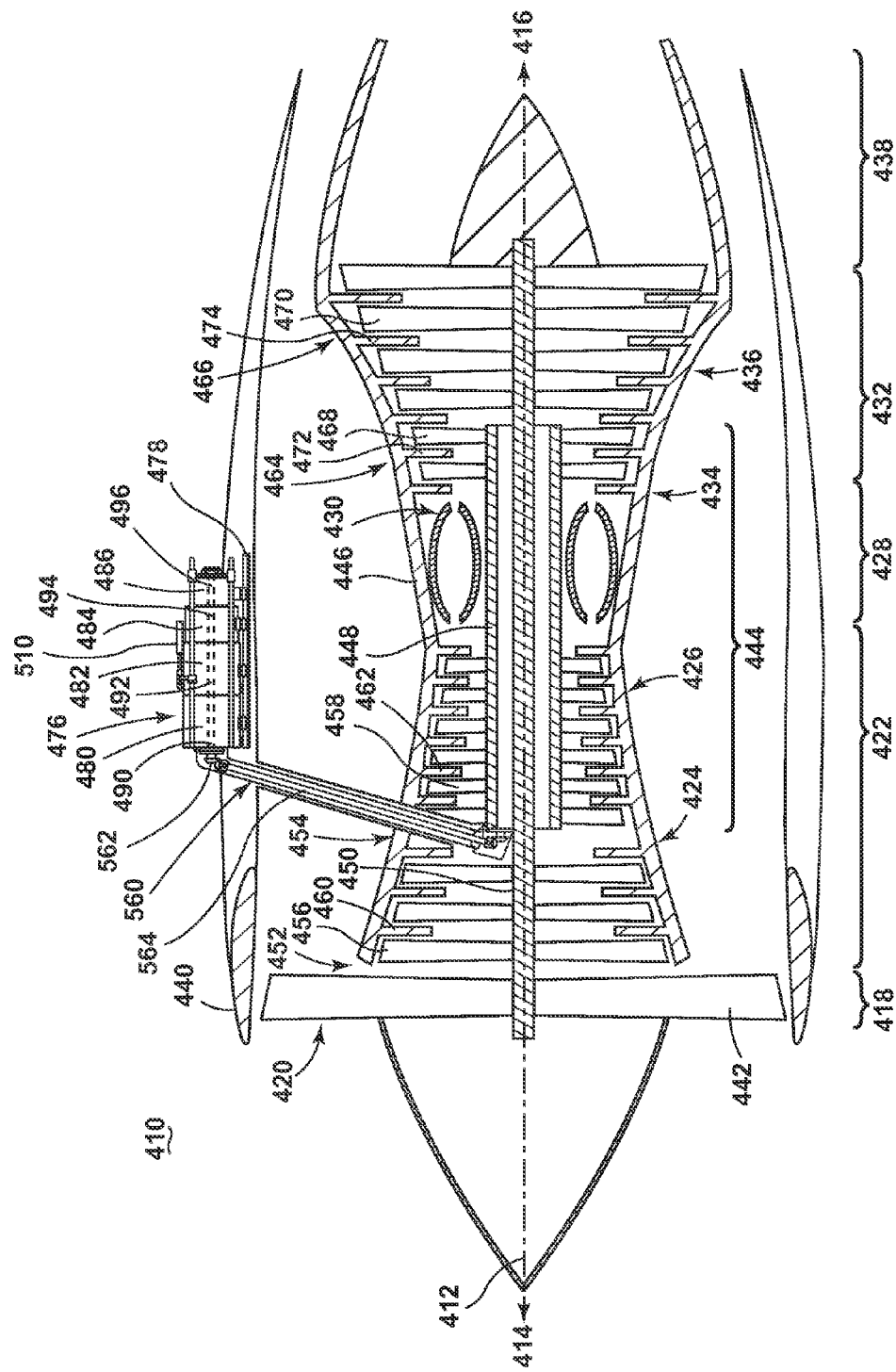
FIG. 5 is a cross-sectional schematic illustration of a gas turbine engine with an accessory apparatus according to another embodiment of the invention.

FIG. 5 illustrates a third embodiment of a gas turbine engine 410 and an accessory apparatus 476. The third embodiment is similar to the first embodiment; therefore, like parts will be identified with like numerals increased by 400, with it being understood that the description of the like parts of the first embodiment applies to the third embodiment, unless otherwise noted. FIG. 5 is identical to the embodiment shown in FIG. 1 except that the accessory apparatus 476 is located on a portion of the fan casing 440 and the accessory apparatus 476 is indirectly coupled to a turbine shaft of the gas turbine engine 410. More specifically, the HP spool 448 is illustrated as being operably coupled with a gearbox or gearing mechanism 560, which in turn drives a second shaft 562. By way of non-limiting example, the gearing mechanism that includes a radial driveshaft 564 that extends from the core 444 through the core casing 446 and into the fan casing 440.

The mount rail 478 can attach to a portion of the gas turbine engine 410 including, but not limited to, the fan casing 440 and the mount rail 478 can extend parallel to the second shaft 562. The accessory components 480, 482, 484 and 486 are mounted to the mount rail 478, and each having an individual accessory shaft 490, 492, 494, 496 to power the accessory components 480, 482, 484, 486, respectively. The first accessory component 480 is operably coupled to the second shaft 562. The accessory shafts 490, 492, 494, 496 of the accessory components 480, 482, 484, 486 are connected with each other and the accessory shafts of the accessory components 480, 482, 484 and 486 are disposed to be coaxial with the second shaft and with each other.

During operation the HP spool 448 rotates when the turbine engine 410 is energized, and the gear mechanism 560 transfers rotational motion of the HP spool 448 to the second shaft 562. In all other ways the embodiment of FIG. 5 is structured and operates in the same manner as the first embodiment illustrated in FIG. 1.

Figure 6:
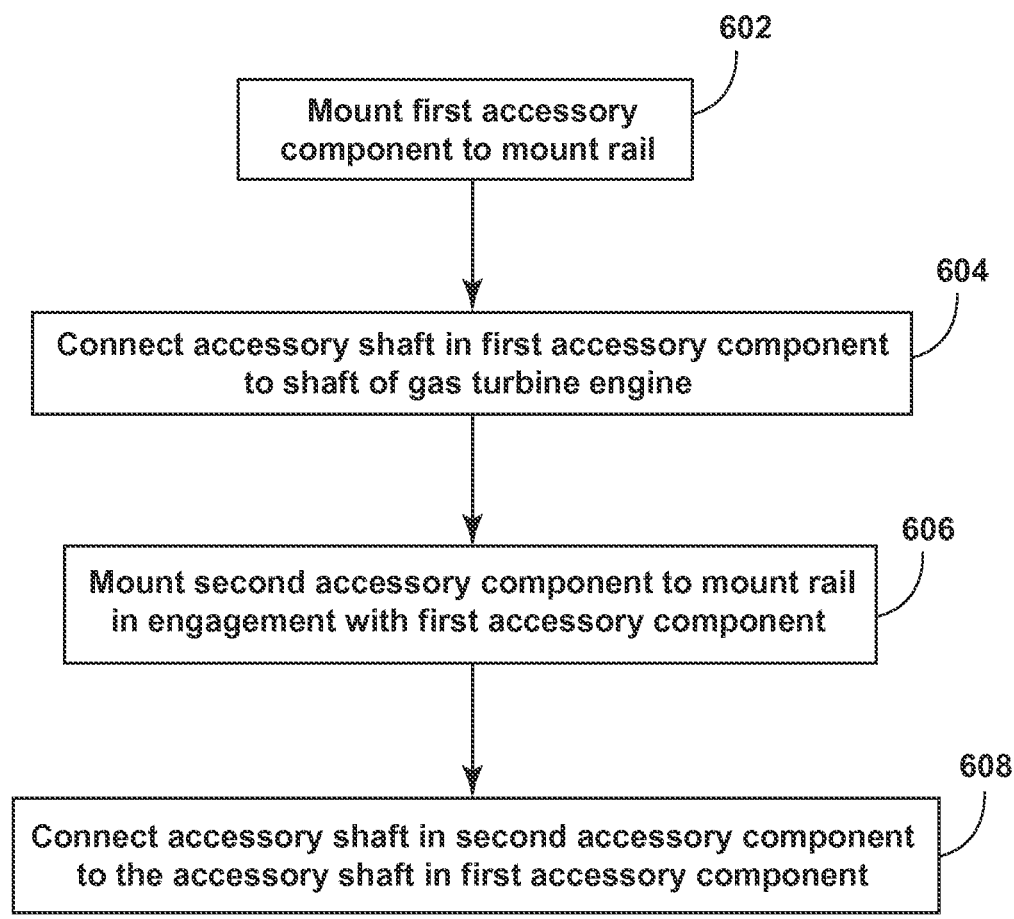
FIG. 6 is a flow chart of a method for assembling accessories with a turbine engine according to yet another embodiment of the invention.

In accordance with an embodiment of the invention, FIG. 6 illustrates an assembly method 600 for assembling accessories with a turbine engine such as the turbine engine 10 or 410. For ease of explanation the assembly method 600 will only discuss the assembly with respect to two accessory components; however, it will be understood that any number of accessory components can be included and assembled according to the described method. The method can begin at 602 by mounting a first accessory component 80, 280, 480 to a mount rail 78, 278, 478 secured to the gas turbine engine 10, 410 and extending away from the turbine engine 10, 410 parallel to a shaft 48, 50, 448, 450 of the gas turbine engine 10, 410.

An accessory shaft 90, 290, 490 in the first accessory component 80, 280, 480 can then be connected to the shaft 48, 50, 448, 450 of the gas turbine engine 10, 410 at 604. At 606, a second accessory component 82, 282, 482 can be mounted to the mount rail 78, 278, 478 and mounted in engagement with the first accessory component 80, 280, 480. At 608, an accessory shaft 92, 292, 492 in the second accessory component 82, 282, 482 can be mounted to the accessory shaft 90, 290, 490 in the first accessory component 80, 280, 480. This can include that scavenge circuits in the first 80, 280, 480 and second accessory components 82, 282, 482 can be aligned to be in fluid communication and the second accessory component 82, 282, 482 can be secured to the first accessory component by a clamp nut 102, 302, 502 attached to a clamp rail 100, 300, 500.

It will be understood that the method of assembly 600 is flexible and the steps illustrated are merely for illustrative purposes. For example, the sequence of steps depicted is for illustrative purposes only, and is not meant to limit the method in any way, as it is understood that the steps can proceed in a different logical order or additional or intervening steps can be included without detracting from embodiments of the invention. By way of non-limiting example, it is also contemplated that a gear mechanism can be disposed between the first and second accessory components to drive the one of the accessory components at a speed different than a rotational speed of the first shaft of the gas turbine engine.

Further still, the method 600 can include un-mounting the second accessory component 82, 282, 482. By way of non-limiting example, a jacking lever 110, 310, 510 can be applied to the second accessory component 82, 282, 482.

The second accessory component 82, 282, 482 can then be disengaged from the first accessory component 80, 280, 480 using the jacking lever 110, 310, 510 and the second accessory component 82, 282, 482 can be un-mounted from the mount rail 78, 278, 478. During the un-mounting, the first accessory shaft 92, 292, 492 in the second accessory component 82, 282, 482 can be disconnected from the accessory shaft 90, 290, 490 in the first accessory component 80, 280, 480.

Embodiments of the invention provide a variety of benefits including that the accessory gearbox can be eliminated. More specifically the above-described embodiments allow for engine accessories that would normally be driven through an accessory gearbox to be stacked in a linear configuration. The above-described embodiments result in a system that has a reduced volume, reduced part count, lower weight, less cost, less heat generation, and reduced oil consumption. The above-described embodiments are less complex and have a predictable accessory layout that can reduce the removal time for accessory components.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An accessory apparatus for a gas turbine engine having a first shaft that rotates when the gas turbine engine is energized, the apparatus comprising:
    at least one mount rail attached to the gas turbine engine and extending parallel to the first shaft of the gas turbine engine;
    a first accessory having a first mounting block, to mount the first accessory to the mount rail, and a first accessory shaft to power the first accessory; and
    a second accessory having a second mounting block, to mount the second accessory to the mount rail, and a second accessory shaft to power the second accessory;
    wherein the first accessory shaft and the second accessory shaft are operably coupled to the first shaft of the gas turbine engine and with each other;
    wherein the first accessory or the second accessory is mounted to the at least one mount rail via its mounting block and its corresponding accessory shaft is connected to the first shaft of the gas turbine engine; and
    wherein the first accessory shaft and the second accessory shaft are connected to each other;
    further comprising at least one clamp rail attached to the gas turbine engine and spaced from and extending parallel to the at least one mount rail, and a clamp nut slidably mounted to the at least one clamp rail and attached to the first accessory or the second accessory that does not have its individual accessory shaft connected to the first shaft of the gas turbine engine.

2. The accessory apparatus of claim 1, wherein the first accessory or the second accessory has a gear mechanism to drive the first accessory or the second accessory at a speed different than a rotational speed of the first shaft of the gas turbine engine.

3. The accessory apparatus of claim 1, further comprising a gear mechanism between the first accessory and the second accessory to drive the first accessory or the second accessory at a speed different than a rotational speed of the first shaft of the gas turbine engine.

4. The accessory apparatus of claim 1, further comprising a jacking lever mounted to the at least one clamp rail and configured to urge the first accessory or the second accessory away from the other of the first accessory or the second accessory for removal from the accessory apparatus.

5. The accessory apparatus of claim 1 wherein the first accessory and the second accessory include a starter, a fuel pump, a lubrication pump, a hydraulic pump, a permanent magnet alternator (PMA), a permanent magnet generator (PMG), a variable frequency generator (VFG), or a line replaceable unit.

6. An accessory apparatus for a gas turbine engine having a first shaft that rotates when the gas turbine engine is energized, the apparatus comprising:
    at least one mount rail attached to the gas turbine engine and extending parallel to the first shaft of the gas turbine engine;
    a first accessory having a first mounting block, to mount the first accessory to the mount rail and a first accessory shaft to power the first accessory; and
    a second accessory having a second mounting block, to mount the second accessory to the mount rail, and a second accessory shaft to power the second accessory;
    wherein the first accessory shaft and the second accessory shaft are operably coupled to the first shaft of the gas turbine engine and with each other;
    wherein the first accessory or the second accessory is mounted to the at least one mount rail via its mounting block and its corresponding accessory shaft is connected to the first shaft of the gas turbine engine; and
    wherein the first accessory shaft and the second accessory shaft are connected to each other;
    further comprising an oil scavenge circuit extending through the first accessory and the second accessory.

7. An accessory apparatus for a turbine engine having a first shaft that rotates when the turbine engine is energized, and having a gearbox to transfer rotational motion of the first shaft of the turbine engine to a second shaft, the apparatus comprising:
    at least one mount rail attached to the turbine engine and extending parallel to the second shaft; and
    at least two accessories, each having a mounting block to mount the respective accessory to the mount rail, and each having an individual accessory shaft to power the accessory;
    wherein the individual accessory shafts are disposed to be coaxial with the second shaft and with each other;
    wherein one of the at least two accessories is mounted to the at least one mount rail via its mounting block with its individual accessory shaft connected to the second shaft; and
    wherein the individual accessory shafts are connected to each other;

further comprising at least one clamp rail attached to the turbine engine and spaced from and extending parallel to the at least one mount rail, and a clamp nut slidably mounted to the at least one clamp rail and attached to the one of the at least two accessories having its individual accessory shaft not connected to the second shaft.

8. The accessory apparatus of claim 7 wherein one of the at least two accessories has a gear mechanism to drive the one of the at least two accessories at a speed different than a rotational speed of the second shaft.

9. The accessory apparatus of claim 7, further comprising a gear mechanism between the at least two accessories to drive the one of the at least two accessories at a speed different than a rotational speed of the second shaft.

10. The accessory apparatus of claim 7, further comprising a jacking lever mounted to the at least one clamp rail and configured to urge one of the at least two accessories away from an adjacent one of the at least two accessories for removal from the accessory apparatus.

11. The accessory apparatus of claim 7, further comprising an oil scavenge circuit extending through the at least two accessories.

12. The accessory apparatus of claim 7 wherein the at least two accessories include a starter, a fuel pump, a lubrication pump, a hydraulic pump, a permanent magnet alternator (PMA), a permanent magnet generator (PMG), a variable frequency generator (VFG), or a line replaceable unit.

13. A method of assembling accessories with a turbine engine comprising:
    mounting a first accessory component to a mount rail secured to a gas turbine engine having a first shaft that rotates when the turbine engine is energized, and extending away from the turbine engine parallel to the first shaft of the gas turbine engine;
    connecting an accessory shaft in the first accessory component to the first shaft of the gas turbine engine;
    mounting a second accessory component to the mount rail and in engagement with the first accessory component; and
    connecting an accessory shaft in the second accessory component to the accessory shaft in the first accessory component;
    further comprising aligning an oil scavenge circuit in each of the first and second accessory components to be in fluid communication.

14. The method of claim 13, further comprising securing the second accessory component to the first accessory component by a clamp nut attached to a clamp rail.

15. The method of claim 13, further comprising disposing a gear mechanism between the first and second accessory components to drive the one of the accessory components at a speed different than a rotational speed of the first shaft of the gas turbine engine.

16. The method of claim 13, further comprising:
    applying a jacking lever to the second accessory component;
    disengaging the second accessory component from the first accessory component using the jacking lever; and
    unmounting the second accessory component from the mount rail.

17. The method of claim 16, further comprising disconnecting the accessory shaft in the second accessory component from the accessory shaft in the first accessory component.

* * * * *

UNITED STATES PATENT AND TRADEMARK OFFICE
CERTIFICATE OF CORRECTION

| | | |
|---|---|---|
| PATENT NO. | : 9,611,787 B2 | Page 1 of 1 |
| APPLICATION NO. | : 14/714501 | |
| DATED | : April 4, 2017 | |
| INVENTOR(S) | : Wotzak | |

It is certified that error appears in the above-identified patent and that said Letters Patent is hereby corrected as shown below:

In the Specification

In Column 5, Line 18, delete "fourth accessory component 88" and insert -- fourth accessory component 86 --, therefor.

In Column 5, Line 19, delete "fourth accessory component 88" and insert -- fourth accessory component 86 --, therefor.

In the Claims

In Column 10, Line 33, in Claim 6, delete "mount rail" and insert -- mount rail, --, therefor.

Signed and Sealed this
Seventh Day of November, 2017

Joseph Matal
*Performing the Functions and Duties of the
Under Secretary of Commerce for Intellectual Property and
Director of the United States Patent and Trademark Office*